US011397109B2

(12) United States Patent
Ilchenko et al.

(10) Patent No.: US 11,397,109 B2
(45) Date of Patent: Jul. 26, 2022

(54) APPARATUS FOR CARRYING OUT POLARIZATION RESOLVED RAMAN SPECTROSCOPY

(71) Applicant: Danmarks Tekniske Universitet, Kgs. Lyngby (DK)

(72) Inventors: Oleksii Ilchenko, Kgs. Lyngby (DK); Anja Boisen, Kgs. Lyngby (DK); Roman Slipets, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 17/259,489

(22) PCT Filed: Jun. 28, 2019

(86) PCT No.: PCT/EP2019/067339
§ 371 (c)(1),
(2) Date: Jan. 11, 2021

(87) PCT Pub. No.: WO2020/011560
PCT Pub. Date: Jan. 16, 2020

(65) Prior Publication Data
US 2021/0270669 A1    Sep. 2, 2021

(30) Foreign Application Priority Data

Jul. 13, 2018 (EP) .................................... 18183474

(51) Int. Cl.
*G01J 3/44* (2006.01)
*G01J 3/02* (2006.01)
*G01J 3/28* (2006.01)

(52) U.S. Cl.
CPC .......... *G01J 3/0224* (2013.01); *G01J 3/0294* (2013.01); *G01J 3/2803* (2013.01); *G01J 3/44* (2013.01)

(58) Field of Classification Search
CPC .... G01J 3/02; G01J 3/28; G01J 3/0224; G01J 3/0294; G01J 3/2803; G01J 3/44;
(Continued)

(56) References Cited

U.S. PATENT DOCUMENTS

| 5,495,850 A | 3/1996 | Zuckerman |
| 2004/0031906 A1 | 2/2004 | Glecker |

(Continued)

FOREIGN PATENT DOCUMENTS

| WO | 01/07881 A1 | 2/2001 |
| WO | 03/089890 A1 | 10/2003 |
| WO | 2017/101669 A1 | 6/2017 |

OTHER PUBLICATIONS

Extended European Search Report for European Patent Application No. EP18183474.8, dated Jan. 9, 2019 in 9 pages.
(Continued)

*Primary Examiner* — Abdullahi Nur
(74) *Attorney, Agent, or Firm* — Knobbe, Martens, Olson & Bear, LLP (57) ABSTRACT

An apparatus for carrying out polarization resolved Raman spectroscopy on a sample (15), in particular a crystalline sample, comprises:
at least one light source (11), in particular at least one laser, for providing excitation radiation to a sample (15),
a spectrograph (31) for dividing light from the sample (15), in particular Raman scattered light from the sample (15), into at least one spectrum of spatially separated wavelength components and for directing at least a portion of the at least one spectrum to a detector (29), in particular a CCD detector,
a polarization state control element (27) for the light from the sample (15), the polarization state control element (27) being arranged in a light path of at least one light beam (25) traveling from the sample (15) towards the detector (29), and
the polarization state control element (27) comprising at least one polarization sensitive optical element (45, 47), in particular a Wollaston prism, the at least one polar-
(Continued)

ization sensitive optical element being adapted to split the at least one light beam (25) into at least two, in particular orthogonally, polarized light beams (35a, 35b, 37a, 37b).

20 Claims, 4 Drawing Sheets

(58) Field of Classification Search
CPC .. G01N 2021/216; G01N 21/21; G01N 21/65; G02B 21/361
See application file for complete search history.

(56) References Cited

U.S. PATENT DOCUMENTS

| | | | |
|---|---|---|---|
| 2005/0283058 A1* | 12/2005 | Choo-Smith | A61B 5/0066 600/315 |
| 2013/0208272 A1 | 8/2013 | Lettleton | |
| 2013/0335735 A1* | 12/2013 | Kambhampati | G01J 3/08 356/300 |
| 2015/0033876 A1 | 2/2015 | Jordan | |
| 2016/0103073 A1 | 4/2016 | Ford et al. | |

OTHER PUBLICATIONS

Kiefer, "Simultaneous Acquisition of the Polarized and Depolarized Raman Signal with a Single Detector"; Analytical Chemistry, ACS Publications, (2017) 89, pp. 5725-2728.

Larson et al., "Three-dimensional X-ray structural microscopy with submicrometre resolution"; Macmillan Magazines Ltd., Nature, vol. 415, Feb. 21, 2002, pp. 887-890.

Munisso et al., "Raman tensor analysis of sapphire single crystal and its application to define crystallographic orientation in polycrystalline alumina"; Physica Status Solidi B 246, No. 8, 1893-1900 (2009), DOI 10.1002/pssb.200945137.

Ramabadran et al., "Intensity analysis of polarized Raman specla for off axis single crystal silicon"; Materials Science & Engineering B 230 (2018) pp. 31-42.

* cited by examiner

APPARATUS FOR CARRYING OUT POLARIZATION RESOLVED RAMAN SPECTROSCOPY

The present invention relates to an apparatus for carrying out polarization resolved Raman spectroscopy on a sample, in particular a crystalline sample.

Spectroscopy generally refers to the process of measuring energy or intensity as a function of wavelength in a beam of light. Spectroscopy uses absorption, emission, or scattering of light by physical matter, in particular atoms, molecules or ions, to qualitatively and quantitatively study physical properties and processes of matter.

Light or radiation directed at a sample during operation of a spectrometer system may be referred to as incident radiation. Redirection of incident radiation following contact with the sample is commonly referred to as scattering of radiation. To the extent that atoms or molecules in a sample absorb all or a portion of the incident radiation, rather than reflect incident radiation, a sample may become excited, and the energy level of the sample may be increased to a higher energy level. Light may be scattered but may continue to have the same wavelength as the incident radiation, a condition commonly referred to as Rayleigh or elastically scattered light. Incident radiation that is scattered by the sample during, for example, a change of vibrational state in molecules may be scattered with a different energy, and such scattered light may be called Raman scattered light. Such phenomena have been used in conjunction with spectroscopy to qualitatively and quantitatively study physical properties and processes, including identification of chemical properties, compositions, and structures of samples.

If incident radiation is directed at a sample, the wavelength of the incident radiation may remain substantially unchanged in scattered radiation. Alternatively, if incident radiation is directed at a sample, the wavelength in the scattered radiation may acquire one or more different wavelengths than the incident wavelength. The energy differential between the incident radiation and the scattered radiation may be referred to as a Raman shift. Spectroscopic measurement of Raman scattered light may seek to measure the resulting wavelengths of such scattered light.

The phenomenon of Raman scattered light is useful in spectroscopy applications for studying qualities and quantities of physical properties and processes, including identification of chemical properties, compositions, and structure in a sample. Raman shift spectroscopic analytical techniques are used for qualitative and quantitative studies of samples. If incident radiation is used to scatter light from a sample, and scattered radiation data is measured, the scattered radiation may provide one or more frequencies associated with the sample, as well as the intensities of those shifted frequencies. The frequencies may be used to identify the chemical composition of a sample.

Raman spectrometers are an example of spectrometers for measuring inelastically scattered light and they are commonly used for obtaining a Raman spectrum of a sample. When a sample is irradiated with monochromatic light, for example from a laser, the light scattered by the sample will contain wavelength components different from those present in the incident light. The so-called Raman scattering of light on molecules present in the sample usually creates this effect. In a Raman spectrometer, the light scattered by the sample is collected and the spectral distribution of the wavelength components having a wavelength different from that of the light source is detected, e.g. in form of a visualized Raman spectrum.

In some measurements of Raman spectra, it may be desired to obtain information about the polarization of the Raman scattered light. For example, polarization dependent characteristics of Raman scattering are dependent on single crystalline quality and crystallographic orientation of a substrate, consisting of, for example, a single crystalline silicon (Si) wafer.

Ramabadran et al. describe in the scientific publication: "Intensity analysis of polarized Raman spectra for off axis single crystal silicon", Materials Science & Engineering B 230, p. 31-42, 2018 that polarized backscattered Raman spectroscopy can be used for identifying the crystallographic orientation of silicon cut off axis.

Munisso et al. propose in the scientific publication "Raman tensor analysis of sapphire single crystal and its application to define crystallographic orientation in polycrystalline alumina", Phys. Status Solidi B 246, No. 8, 1893-1900 (2009) a tensorial algorithm for the practical determination of unknown crystallographic textures in polycrystalline alumina materials.

It is an objective of the present invention to provide efficient means for carrying out polarization resolved spectroscopy on a sample.

The object is satisfied by an apparatus in accordance with the features of claim 1. Preferred embodiments of the present invention are described in the dependent claims.

In accordance with the present invention, an apparatus for carrying out polarization resolved Raman spectroscopy on a sample, in particular a crystalline sample, comprises:

at least one light source, in particular at least one laser, for providing excitation radiation to a sample, a spectrograph for dividing light from the sample, in particular Raman scattered light from the sample, into at least one spectrum of spatially separated wavelength components and for directing at least a portion of the at least one spectrum to a detector, in particular a CCD detector, a polarization state control element for the light from the sample, the polarization state control element being arranged in a light path of at least one light beam traveling from the sample towards the detector, and the polarization state control element comprising at least one polarization sensitive optical element, in particular a Wollaston prism, the at least one polarization sensitive optical element being adapted to split the at least one light beam into at least two, in particular orthogonally, polarized light beams.

Each of the detected spectrum is obtained from a polarized light beam having a known polarization. This is due to the use of the at least one polarization sensitive optical element which splits the incident beam into the at least two polarized light beams leaving the at least one polarization sensitive optical element and traveling towards the detector. The registration of the spectra by the detector occurs simultaneously.

The spectra detected at different polarizations may be employed for a crystallographic analysis of crystalline samples like silicon, for example if applied to an algorithm based on Raman tensor scattering theory of silicon to the measured spectra. An algorithm is for example described in the previously mentioned scientific publication of Ramabadran et al.: "Intensity analysis of polarized Raman spectra for off axis single crystal silicon", Materials Science & Engineering B 230, p. 31-42, 2018. Information obtained from the spectra in conjunction with the algorithm may for example be employed to recognize crystal faces and face rotation angles in randomly grown Si poly-crystals. The obtained information may further be used for the reconstruction of crystallographic maps using for example the same principle as established in 2D X-Ray crystallography analysis, which is described for example by B. Larson, W. Yang, G. Ice, J. Budai, J. Tischler in the scientific article: "3D X-ray structural microscopy with submicrometre resolution", Nature, Vol. 415, 887-890, (2002).

Raman scattering on a sample may in particular be due to vibrational bonds of the sample. Such vibrational bonds can be pumped most efficiently when the incident light has the same polarization/orientation as the vibrational bond. If a vibrational bond is oriented orthogonally to the polarization of the incoming light, it will be pumped with low efficiency. Therefore, an analysis of the Raman spectrum obtained from the sample can be used to determine the orientation of the atomic or molecular bonds, for example in a crystal or a crystal unit cell. This is also applicable to samples having a polycrystalline structure, like polycrystalline sapphire or silicon, or inorganic or organic crystals with a more complex unit cell, such as crystalline drugs, amino acids, peptides or proteins, and to other samples like semiconductors, inorganic composites (such as ceramics, piezo and ferroelectrics, and superconductors, etc.), drugs and biomolecules.

Carrying out a crystallographic analysis on a sample using Raman scattering is also more cost-efficient than X-ray diffraction, electron diffraction, and neutron diffraction. For example, X-Ray diffraction requires expensive equipment and may even require the use of synchrotron radiation, which can only be produced in specialized laboratories.

The apparatus can be employed in a raster-scanning mode. In particular, the apparatus may be used to take a measurement on a surface point of the sample. After that, the sample or the focus on the surface is moved to take a measurement on another surface point. In this way, the surface can be scanned and measurements can be obtained from a plurality of surface points. A 2D or 3D mapping can therefore be carried out which may enable the generation of a 2D or 3D image of crystallographic planes of the sample.

Preferably, the apparatus does not contain any movable parts, such as a device for rotating the sample, and therefore can be realized in an easy to use set-up. However, it may be possible to move the sample with respect to the focus of the beam illuminating the sample, in particular to enable a scanning of the surface of the sample.

The at least one polarization sensitive optical element may in particular be at least one Wollaston prism which can separate randomly polarized or unpolarized light into two separate linearly polarized outgoing beams. A Wollaston prism may consists of two calcite prisms cemented together on their base to form two right triangle prisms with perpendicular optic axes. Wollaston prisms are commercially available from various providers.

The polarization state control element may comprise at least one beam splitting element adapted to split the light beam into at least two split beams, in particular at least two parallel beams, and at least two polarization sensitive optical elements, in particular two Wollaston prisms, arranged such that one of the two split beams passes through one polarization sensitive optical element, and the other one of the two split beams passes through the other one of the polarization sensitive optical elements.

The light beam coming from the sample can therefore be split by use of the beam splitting element, which may be a beam splitter, into at least two split beams. Each of the split beams passes through a polarization sensitive optical element, such as a Wollaston prism, where each of the split beams is further divided into two, in particular orthogonally, polarized light beams. A spectrum of each of the at least four polarized light beams can be detected simultaneously on different regions of the detector. Thus, the apparatus provides at least 4 detection channel, each channel allowing to detect a polarization resolved spectrum of the light scattered from the sample. If more than one spot is illuminated by polarized light on the sample, the number of detected spectra may increase, since each spots may provide a spectrum per detection channel. Thus, two illuminated spots may result in 8 spectra that can be detected.

Preferably, a waveplate, in particular a half-wave plate or a quarter-wave plate, may be arranged in at least one light path between the beam splitting element and one of the polarization sensitive optical elements. Waveplates are known and commercially available.

A waveplate arranged in the light path before one of the polarization sensitive optical elements helps to adjust the polarization of the split beam traveling through this waveplate. Thereby, Raman spectra having a different polarization may be detectable in different detection channels.

The polarization state control element may comprise at least one beam splitting element adapted to split the light beam into three split beams, in particular at least three parallel beams, and three polarization sensitive optical elements arranged such that a first one of the three split beams is passing through a first one of the polarization sensitive optical elements, a second one of the three split beams is passing through a second one of the three polarization sensitive optical elements, and a third one of the three split beams is passing through a third one of the three polarization sensitive optical elements.

The beam splitting element may equally split the incoming beam into the three split beams. They may therefore have the same intensity.

Each of the three split beams pass through one of the polarization sensitive optical elements where each of the split beams is further divided into two, in particular orthogonally, polarized light beams. As a result, in total six polarized light beams may pass through the spectrograph, residing in six spectra that can be detected by use of the detector. The apparatus therefore provides six detectable channels through which simultaneous detection of Raman spectra is possible.

Preferably, a waveplate, in particular a half-wave plate or a quarter-wave plate, is arranged in at least one light path between the beam splitter and one of the three polarization sensitive optical elements.

A first waveplate, in particular a half-wave plate, can be arranged in the light path between the beam splitting element and the first polarization sensitive optical element.

Preferably, a second waveplate, in particular a quarter-wave plate, is arranged in the light path between the beam splitting element and the second polarization sensitive optical element.

Preferably, no waveplate is arranged in the light path between the beam splitting element and the third polarization sensitive optical element.

Two of the three split beams travel therefore through a waveplate, and in particular, one of the beams may travel through a half-wave plate and one of the beams may travel through a quarter-wave plate. The six spectra which may be detected can therefore include information which can be explained as a rotation of an analyzer in the scattering Ramen signal on 0° and 90°, corresponding to a linear laser polarization plane, for depolarization studies of vibrational peaks, on +45° and −45° for polarization rotation measurements and the part of circular-left and circular-right polarized light may be detected on two channels. The polarization angles in all six channels may be different and may be optimized for a particular application. After spectra acquisition, a matrix polarization theory, as already mentioned before, could be applied to the measured spectra, and to recover information about total depolarization of vibrational peaks, artifacts and orientation distribution parameters.

The polarization state control element may be arranged in the light path between the sample and the spectrograph. The polarization state control element may in particular be arranged between the sample and an entrance slit of the spectrograph. The split polarized beams therefore enter the spectrograph and polarization resolved spectra, each of which is associated with one of the split polarized beams, can be detected by the detector, in particular in a particular region of the detector.

At least one beam splitting element may be arranged in the light path between the light source and the sample, the beam splitting element being adapted to split a light beam from the light source into at least a first beam and a second beam. At least a first and a second beam, obtained by splitting an original beam originating from the light source, may therefore be incident on the sample. The two beams may be combined at a slightly different angle between their propagation axes. Such a situation may produce two spots, which are locally separated from each other, in a focal plane on or in the sample. The spectral responses from the spots, as obtained on the detector, may therefore be spatially separated from each other and detectable in different regions of the detector.

A waveplate, preferably a half-wave plate or a quarter-wave plate, may be arranged in the light path of the second beam in between the beam splitting element and the sample, for generating a polarization manipulated second beam. The polarization of the second beam may therefore be adjusted.

Preferably, at least one beam combiner may combine the first beam and the polarization manipulated second beam and direct the combined beams onto the sample, preferably generating two spatially separated spots in the same focal plane on the sample. This may also have the effect that the spectral responses, as detected by the detector, are spatially separated from each other. This means that different spectra may be detectable in the different regions of the detection window of the imaging sensor.

The at least one beam splitting element may be adapted to split the light beam from the light source into a first beam, a second beam, and a third beam. Three beams may therefore be incident on the sample and focused on spatially separated spots on or in the sample.

Preferably, a waveplate, for example a half-wave plate or a quarter-wave plate, may be arranged in the light path of the second beam in between the beam splitting element and the sample, for generating a polarization manipulated second beam.

A further waveplate, preferably a half-wave plate or a quarter-wave plate, can be arranged in the light path of the third beam in between the beam splitting element and the sample, for generating a polarization manipulated third beam. The polarization of the respective beam may therefore be adjusted.

At least one beam combiner may be provided to combine the first beam, the polarization manipulated second beam and the polarization manipulated third beam and to direct the combined beams onto the sample.

The at least one beam combiner and/or the light path before and after the beam combiner are preferably arranged such that the combined beams are directed to three spatially separated spots that are produced in the same focal plane on or in the sample.

At least one beam combiner may be provided to combine two or more light beams from two or more different light sources and to direct the combined beams onto the sample, preferably to spatially separated spots in the same focal plane on the sample. The light beams incident on the sample and used for the generation of Raman scattered light from the sample may therefore be provided by two or more light sources. The light sources may provide light at different wavelengths, for example one light source may provide laser light at 780 nm, one light source may provide laser light at 785 nm, and a further light source may provide laser light at 790 nm.

The light beam from at least one of the light sources may be a polarization manipulated beam. This may for example be achieved by use of a polarizer placed in the light path of the beam exiting from the light source. The polarization of at least one of the light beams incident on the sample may therefore be adjusted.

The invention also relates to a system for determining at least one property of a crystalline sample, in particular an orientation of a surface plane of the crystalline sample, the system comprises:

an apparatus in accordance with the present invention, and a computer system adapted to employ spectra obtained by the apparatus from a measurement on a sample in an algorithm based on Raman tensor scattering theory, the algorithm being executable by the computer system to obtain crystallographic information about the sample.

The invention also relates to a method of carrying out at least one measurement on a crystalline sample, the method comprises the step of using an apparatus in accordance with the present invention to obtain simultaneously at least two spectra from the sample.

Preferably, the method further includes the step of using the spectra in a pregiven algorithm, in particular implemented on a computer system, to obtain crystalline information about the sample.

One or more examples will hereinafter be described in conjunction with the following drawing figures, where like numerals denote like elements.

Figure 1:
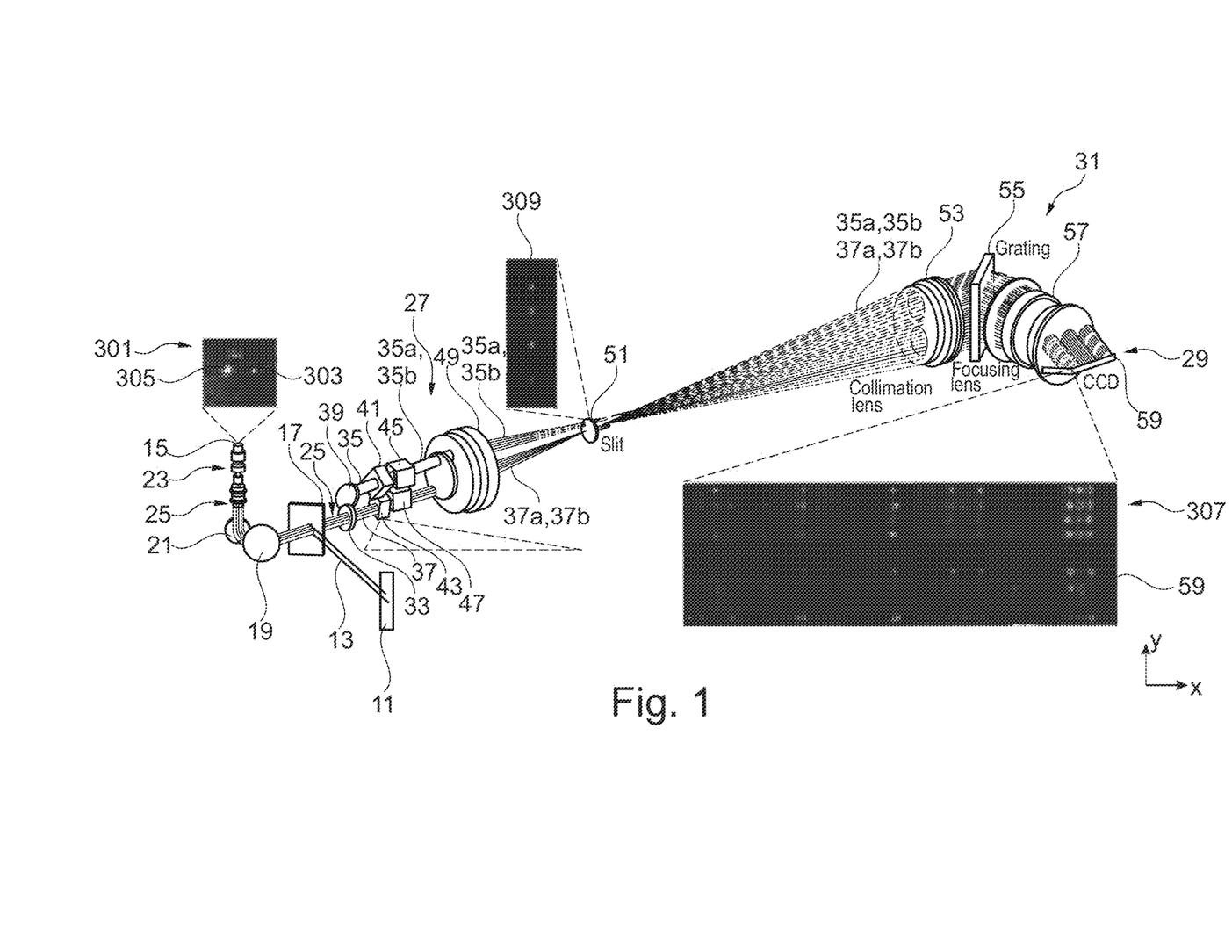
FIG. 1 shows schematically a first variant of an apparatus for carrying out polarization resolved Raman spectroscopy on a sample.

The apparatus shown in FIG. 1 comprises at least one light source 11, which is preferably a laser, for providing a light beam 13 of excitation radiation to a sample 15. In particular, the light beam 13, which is in particular a laser beam, is split into two orthogonally polarized laser beams. Thus, preferably two orthogonally polarized laser beams 13 are incident on the sample 11. The two orthogonally polarized laser beams 13 are reflected by a dichroic beam splitting mirror 17 and further guided by mirrors 19 and 21 to an objective 23 which comprises a plurality of lenses to focus the laser beams 13 on the sample 15.

The orthogonally laser beams 13 are slightly deviating in their propagation direction and thus, the objective focuses them to two spatially separated spots 303, 305 as shown in the window 301 obtained from a photo of the focal plane on the sample 15.

The optical setup is arranged in a backscattering geometry such that the objective 23 also serves for collecting the light scattered from the sample 15, in particular from the two illuminated spots 303, 305. The backscattered light beam 25, at least the spectral components of the backscattered light beam that are different from the spectral components of the laser beam 13, can pass through the dichroic mirror 17 and enter a polarization state control element 27 for the light beam 25 scattered from the sample 15.

The polarization state control element 27 is arranged in the light path of the light beam 25 collected by the objective 23 and traveling towards a detector 29 and before the light path passes through a spectrograph 31. The polarization state control element 27 comprises a beam splitter 33 adapted to split the light beam 25 into a first split beam 35 and a second split beam 37, which are traveling in parallel to each other after the first split beam 35 is reflected by mirror 39.

The first beam 35 passes through a half-wave plate 41 while the second beam 37 passes through an optical element 43, for example a quarter-wave plate, which may also chance the polarization state of the second beam 37.

Subsequently, the first beam 35 passes through a first polarization sensitive optical element, here a first Wollaston prism 45, which splits the first beam 35 into two orthogonally polarized beams 35a, 35b which are depicted in FIG. 1 as a single beam. The polarization of the beam 35a may for example be 0° and the polarization of the beam 35b may for example be 90°. The second beam 35 passes through a second polarization sensitive optical element, here a second Wollaston prism 47, which splits the second beam 37 into two orthogonally polarized beams 37a, 37b which are depicted in FIG. 1 as a single beam. The polarization of the beam 37a may for example be +45° and the polarization of the beam 37b may for example be −45°.

The optical system of the apparatus of FIG. 1 further comprises a lens system 49, which may also be a slit lens, and which is adapted to focus the polarized beams 35a, 35b, 37a, 37b leaving the Wollaston prisms 45, 47 through a slit 51 of the spectrograph 31. The lens system 49 may also include an edge filter.

The spectrograph 31 comprises a collimation lens system 53 having a focus in the slit. The collimation lens system 53 transfers the beams 35a, 35b, 37a, 37b into collimated beams which may pass through an optional edge filter (not shown) and a transmission grating 55.

The grating 55 divides each of the beams 35a, 35b, 37a, 37b into a respective spectrum of spatially separated wavelength components and directs at least a portion of each spectrum via a focusing lens system 57 on an array of pixels 59 of the detector 29 to detect the spectrum of each polarized beam 35a, 35b, 37a, 37b.

Window 307 shows the spectra measured on the array of pixels 59. As can be seen, eight different spectra can be measured simultaneously. The spectra are separated from each other along the y-axis. The spots that are spatially distributed along the x-axis are associated with the different wavelengths contained in each spectrum.

The eight spectra are due to the fact that the sample 15 is illuminated in 2 spots with 2 beams of different polarization. Therefore, the backscattered beam 25 comprises in fact two backscattered Raman beams due to the 2 spots 303, 305 and the different polarizations of the incident light. Sample responses from different incident laser polarization are therefore collected simultaneously. Furthermore, the beam splitter 33 splits each of the two backscattered Raman beams such that they pass through each Wollaston prism 45, 47. Hence, each of the polarized beams 35a, 35b, 37a, 37b comprises in fact two beams due to their origin from 2 spots illuminated with different laser polarization. Hence, in total 8 beams leave the Wollaston prisms and pass through the entrance slit 51 of the spectrograph 31. This is shown in window 309 which is derived from a photo of the plane of the slit 51 and which shows that eight beams travel through slit 51 where they are spatially separated from each other. This explains the eight spectra that are detectable on the array of pixels 59.

Figure 2:
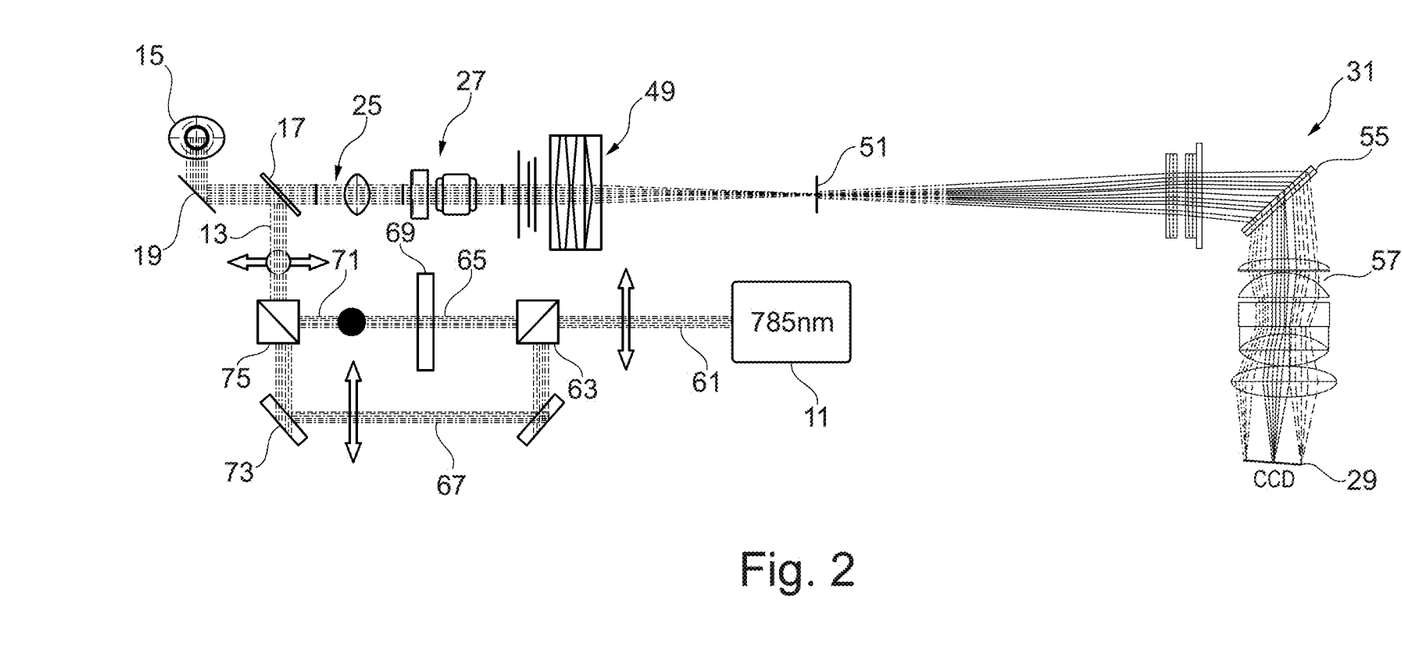
FIG. 2 shows schematically a second variant of an apparatus for carrying out polarization resolved Raman spectroscopy on a sample.

The optical setup of the apparatus of FIG. 2 corresponds in substance to the optical setup of the apparatus of FIG. 1. Correspondingly, the apparatus of FIG. 2 can also detect eight spectra simultaneously as explained above.

The apparatus of FIG. 2 comprises a laser 11 as light source, emitting light at a wavelength of 785 nm. The laser 11 may for example be a diode laser. Beam splitter 63 splits laser beam 61 into two beams 65, 67. The beam 65 travels through half-wave plate 69 which changes the polarization of the beam 65. The beam 71 emerging from the half-wave plate 69 and the beam 67 are combined by mirror 73 and beam splitter 75 to laser beam 13.

As explained with respect to FIG. 1, beam 13 therefore consists of in fact two beams with different polarization. The beams 67 and 71 will be combined such that their propagation axes slightly deviate from each other. This will produce two spots (similar to spots 303, 305 in FIG. 1) in the sample focal plane. An adjustment of the propagation axis of the beam 67 is for example possible by tilting the mirror 73.

Figure 3:
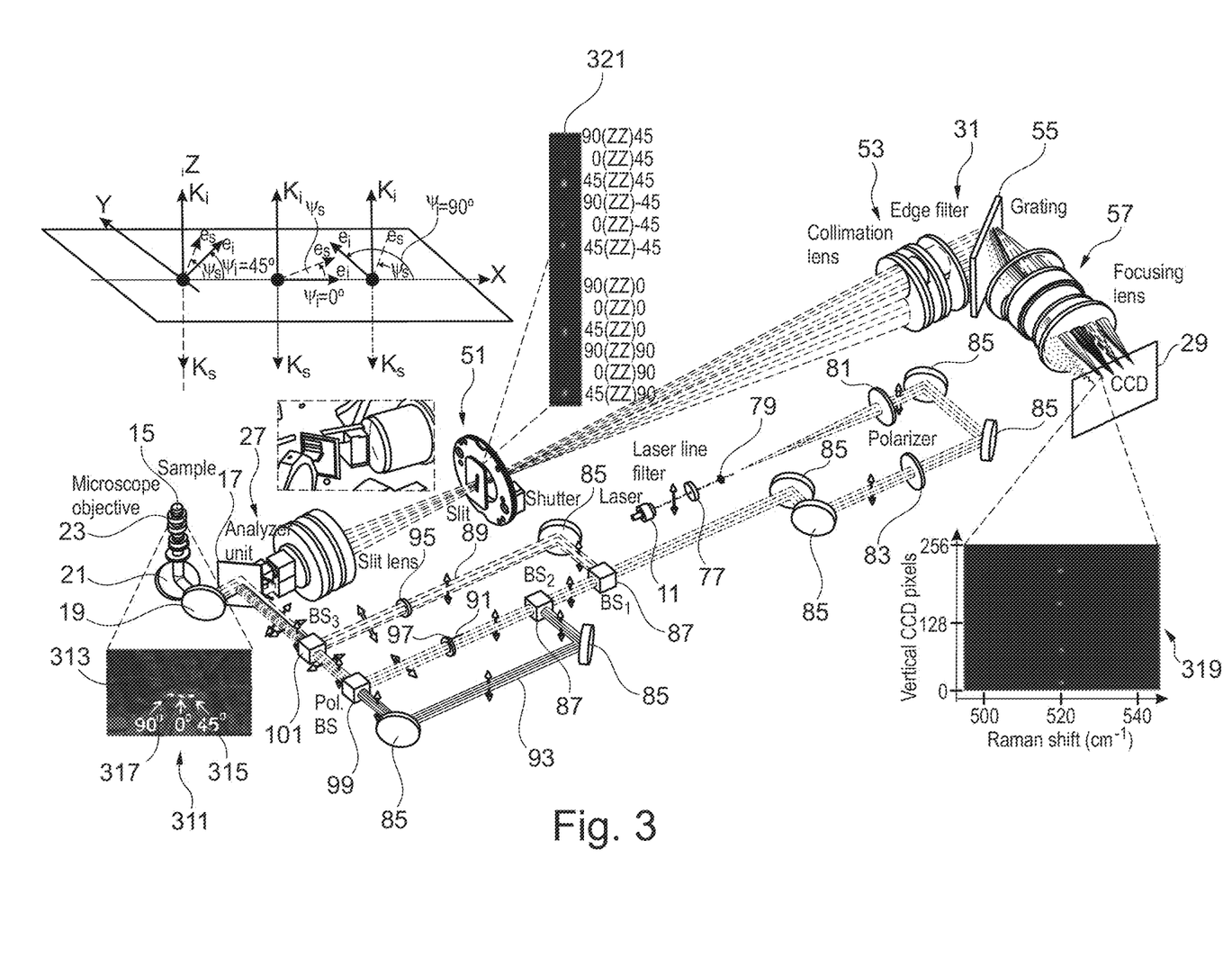
FIG. 3 shows schematically a third variant of an apparatus for carrying out polarization resolved Raman spectroscopy on a sample.

The optical setup of the apparatus of FIG. 3 is similar to the optical set-up of the apparatuses of FIGS. 1 and 2 as described before. However, the light emitted by laser 11 is passing through some optical elements 77, 79, 81, 83 with line filter 79 and linear polarizers 81, 83, reflected by mirrors 85 and split, by use of beam splitters 87 into three beams 89, 91, 93. The split beam 89 passes through waveplate 95 and the split beam 91 passes through waveplate 97 while the beam 93 does not pass through a waveplate. This results in three beams with polarization of 0°, 45° and 90° which are, by use of beam splitters 99 and 101, combined at a slightly different angle in their propagation axes resulting in three spots 313, 315 and 317 as shown in window 311 in a focal plane on the sample 15.

The path of the backscattered light corresponds in substance to the path as described above with respect to FIG. 1. As a result, due to the three spots 313, 315, 317 caused by light of different polarization and the splitting of the beams from these spots in the polarization state control element 27, twelve polarization resolved beams travel through the slit 51, which may be equipped with a shutter, as shown in window 312. Consequently, twelve polarization resolved Raman spectra can be detected on the array of pixels of detector 29 as shown in window 319.

As an option, the optical setup of the apparatus of FIG. 3 may comprise a polarization state control element 27 that includes at least one beam splitting element which is adapted to split a light beam coming from the sample into three split beams. A first waveplate, such as a half-wave plate, may be arranged in the light path between the beam splitting element and a first polarization sensitive optical element, in particular a first Wollaston prism. A second waveplate, in particular a quarter-wave plate, may be arranged in the light path between the beam splitting element and a second polarization sensitive optical element, in particular a second Wollaston prism. No waveplate may be arranged in the light path between the beam splitting element and a third polarization sensitive optical element, in particular a third Wollaston prism (not shown). As described before, each Wollaston prism splits each incident beam into two separate linearly outgoing beams.

Thus, per incoming beam, the three Wollaston prisms generate six outgoing beams that travel towards the spectrograph 31. The three beams originating from Raman scattering in the spots 313, 315, 315 may therefore result in 18 beams which leave the three Wollaston prisms. Consequently, 18 spectra can be detected on the array of pixels of detector 29 as shown in window 319.

Figure 4:
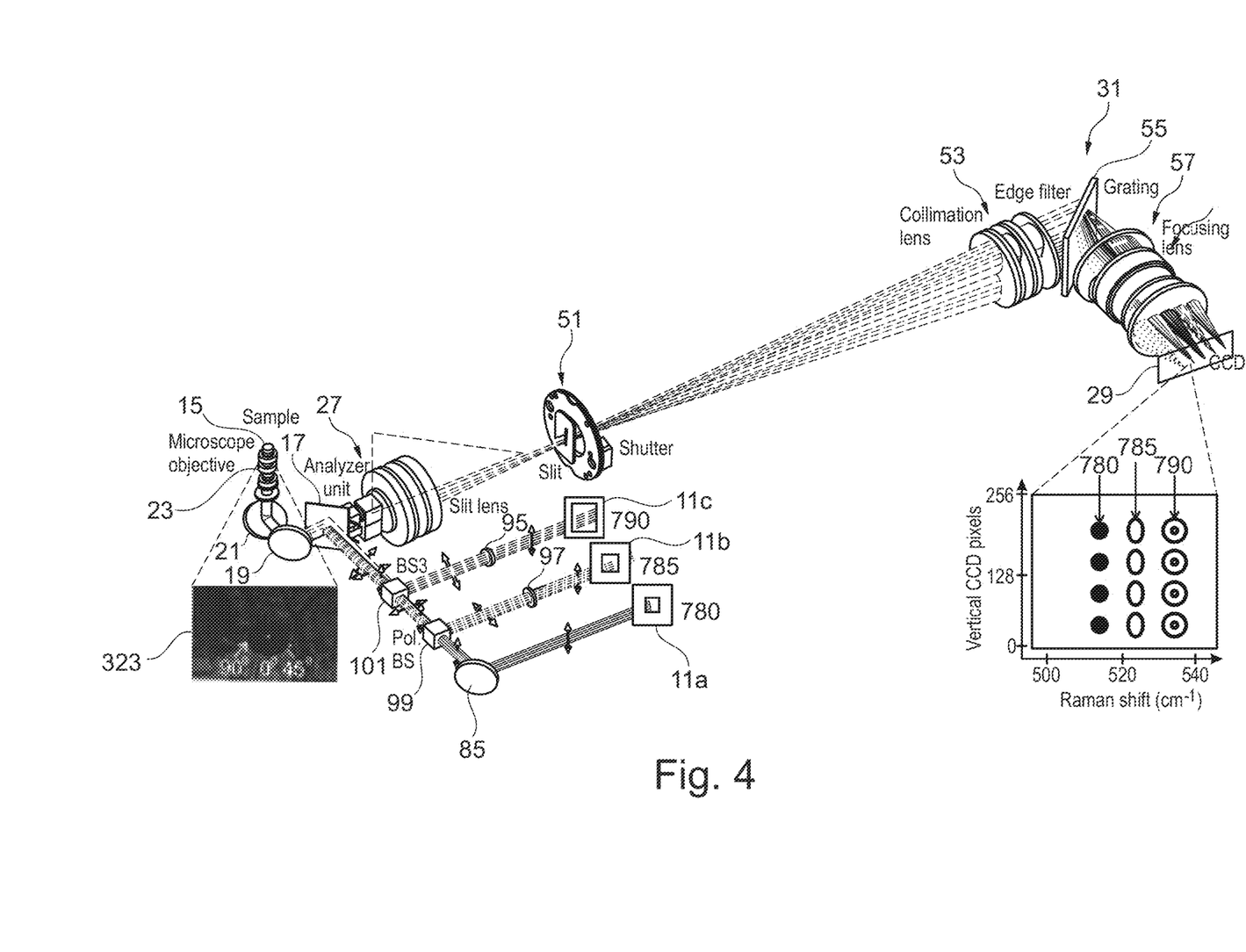
FIG. 4 shows schematically a fourth variant of an apparatus for carrying out polarization resolved Raman spectroscopy on a sample.

The optical setup of the apparatus of FIG. 4 corresponds in substance to the optical setup of the apparatus of FIG. 3. However, the apparatus of FIG. 4 comprises three lasers 11a, 11b and 11c, illuminating linearly polarized light at 780 nm, 785 nm and 790 nm. The polarization of the light from laser 11c is changed by 45° by waveplate 95, and the polarization of the light from laser 11b is changed by 90° by waveplate 97. The light from the three lasers is combined by use of mirror 85 and beam splitters 99, 101 such that the laser beams propagate slightly into different directions, resulting again in three spots of laser light with different polarization (0°, 45°, 90°) as indicated in window 323 (obtained from a picture of the focal plane of the objective 23). The spots are illuminated by light at different wavelengths due to the different lasers 11a, 11b, 11c.

Information obtained from the measured spectra can be used in an algorithm as described, for example, in the previously mentioned article of Ramabadran et al. The algorithm can be based on Raman tensor scattering theory. Thereby, crystallographic maps of the sample can be obtained, for example by using the same principles as in X-ray crystallography.

LIST OF REFERENCE SIGNS 11 light source, laser
11a laser
11b laser
11c laser
13 laser beam
15 sample
17 dichroic mirror
19 mirror
21 mirror
23 objective
25 light beam
27 polarization state control element
29 detector
31 spectrograph
33 beam splitter
35 first split beam
35a polarized beam
35b polarized beam
37 second split beam
37a polarized beam
37b polarized beam
39 mirror
41 half-wave plate
43 optical element
45 first Wollaston prism
47 second Wollaston prism
49 lens system
51 slit
53 collimation lens system
55 grating
57 focusing lens system
59 array of pixel
61 laser
63 beam splitter
65 beam
67 beam
69 half-wave plate
71 beam
73 mirror
75 beam splitter
77 optical element
79 optical element, line filter
81 optical element, polarizer
83 optical element, polarizer
85 mirror
87 beam splitter
89 beam
91 beam
93 beam
95 waveplate
97 waveplate
99 beam splitter
101 beam splitter
301 window
303 spot
305 spot
307 window
309 window
311 window
313 spot
315 spot
317 spot
319 window
321 window
323 window

The invention claimed is:

1. An apparatus for carrying out polarization resolved Raman spectroscopy on a sample, the apparatus comprising:
at least one light source for providing excitation radiation to a sample,
a spectrograph for dividing light from the sample into at least one spectrum of spatially separated wavelength components and for directing at least a portion of the at least one spectrum to a detector),
a polarization state control element for the light from the sample, the polarization state control element being arranged in a light path of at least one light beam traveling from the sample towards the detector, and
the polarization state control element comprising at least one polarization sensitive optical element, the at least one polarization sensitive optical element being adapted to split the at least one light beam into at least two polarized light beams.

2. The apparatus of claim 1, wherein the polarization state control element further comprises at least one beam splitter adapted to split the light beam into at least two split beams and at least two polarization sensitive optical elements arranged such that at least one of the at least two split beams is passing through one of the polarization sensitive optical elements and at least another one of the at least two split beams passes through the other one of the polarization sensitive optical elements.

3. The apparatus of claim 2, wherein a waveplate is arranged in at least one light path between the beam splitter and one of the polarization sensitive optical elements.

4. The apparatus of claim 1, wherein the polarization state control element comprises at least one beam splitter adapted to split the light beam into three split beams, and three polarization sensitive optical elements arranged such that a first one of the three split beams is passing through a first one of the polarization sensitive optical elements, a second one of the three split beams is passing through a second one of the three polarization sensitive optical elements, and a third one of the three split beams is passing through a third one of the three polarization sensitive optical elements.

5. The apparatus of claim 4, wherein a waveplate is arranged in at least one light path between the beam splitter and one of the three polarization sensitive optical elements.

6. The apparatus of claim 4, wherein a first waveplate is arranged in the light path between the beam splitter and the first polarization sensitive optical element.

7. The apparatus of claim 4, wherein a second waveplate is arranged in the light path between the beam splitter and the second polarization sensitive optical element.

8. The apparatus of claim 4, wherein no waveplate is arranged in the light path between the beam splitter and the third polarization sensitive optical element.

9. The apparatus of claim 1, wherein the polarization state control element is arranged in the light path between the sample and the spectrograph.

10. The apparatus of claim 1, wherein at least one beam splitter is arranged in the light path between the light source and the sample, the beam splitter being adapted to split a light beam from the light source into at least a first beam and a second beam.

11. The apparatus of claim 10, wherein a waveplate, preferably a half-wave plate or a quarter-wave plate, is arranged in the light path of at least the second beam in between the beam splitter and the sample, for generating a polarization manipulated second beam, and
wherein, preferably, at least one beam combiner is provided to combine at least the first beam and the polarization manipulated second beam and to direct the combined beams onto the sample, preferably generating at least two spatially separated spots in the same focal plane on the sample.

12. The apparatus of claim 10, wherein the at least one beam splitter is adapted to split the light beam from the light source into a first beam, a second beam, and a third beam, wherein, preferably, a waveplate, preferably a half-wave plate or a quarter-wave plate, is arranged in the light path of the second beam in between the beam splitter and the sample, for generating a polarization manipulated second beam, and
wherein, further preferably, a further waveplate, preferably a half-wave plate or a quarter-wave plate, is arranged in the light path of the third beam in between the beam splitter and the sample, for generating a polarization manipulated third beam.

13. The apparatus of claim 12, wherein at least one beam combiner is provided to combine the first beam, the polarization manipulated second beam and the polarization manipulated third beam and to direct the combined beams onto the sample, preferably generating three spatially separated spots in the same focal plane on the sample.

14. The apparatus of claim 1, wherein at least one beam combiner is provided to combine two or more light beams from two or more different light sources and to direct the combined beams onto the sample, preferably to separated spots in the same focal plane on the sample.

15. The apparatus of claim 14, wherein the light beam from at least one of the light sources is a polarization manipulated beam.

16. The apparatus of claim 1, wherein the sample is a crystalline sample, the at least one light source comprises at least one laser, the light from the sample is Raman scattered light, and the detector is a CCD detector.

17. The apparatus of claim 1, wherein the polarization sensitive optical element is a Wollaston prism.

18. The apparatus of claim 1, wherein the at least one polarization sensitive optical element is adapted to split the at least one light beam into at least two orthogonally polarized light beams.

19. The apparatus of claim 3, wherein the waveplate is a half-wave plate or a quarter-wave plate.

20. The apparatus of claim 4, wherein the beam splitter is adapted to split the light beam into three parallel beams.

* * * * *